Patented July 1, 1947

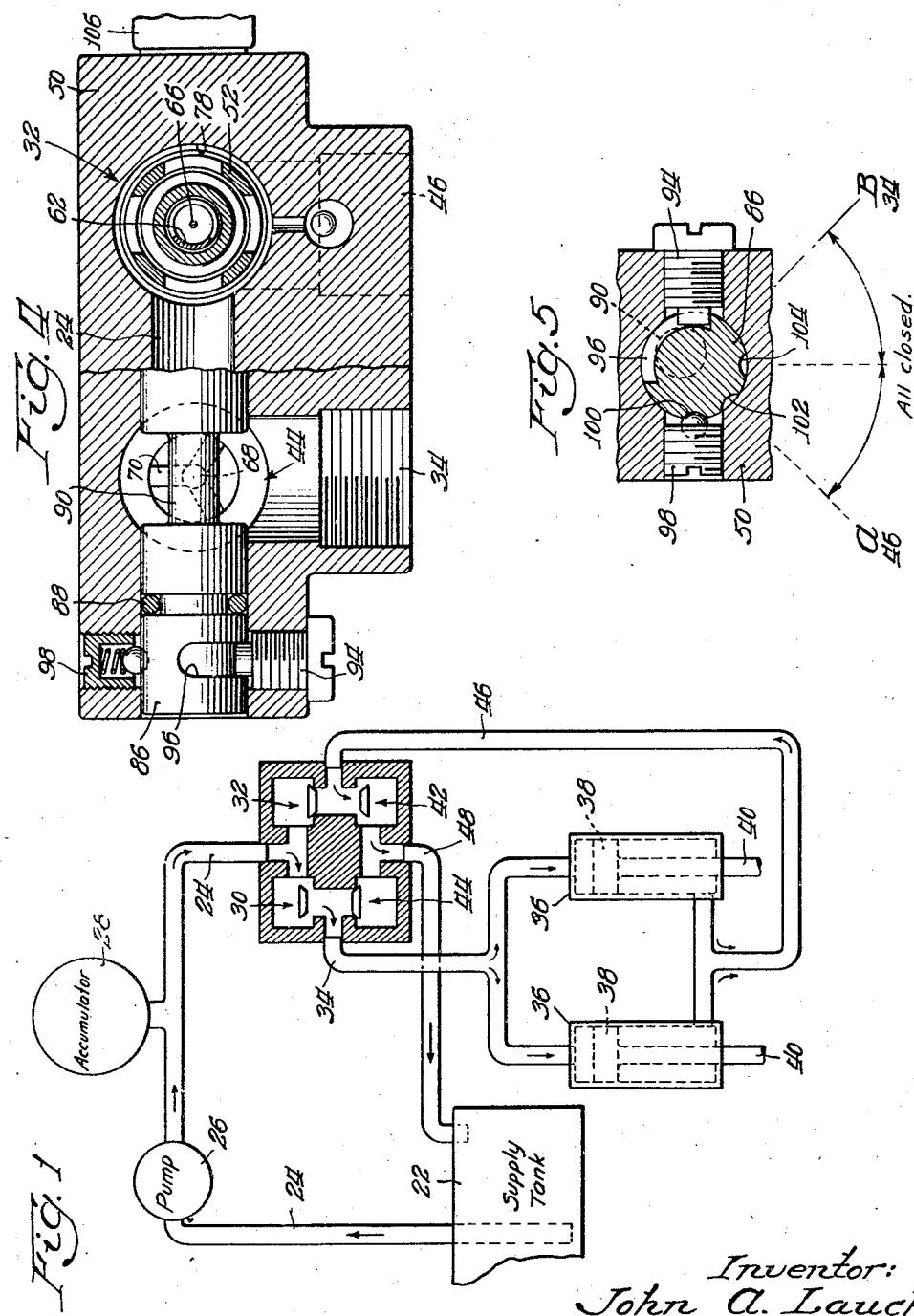

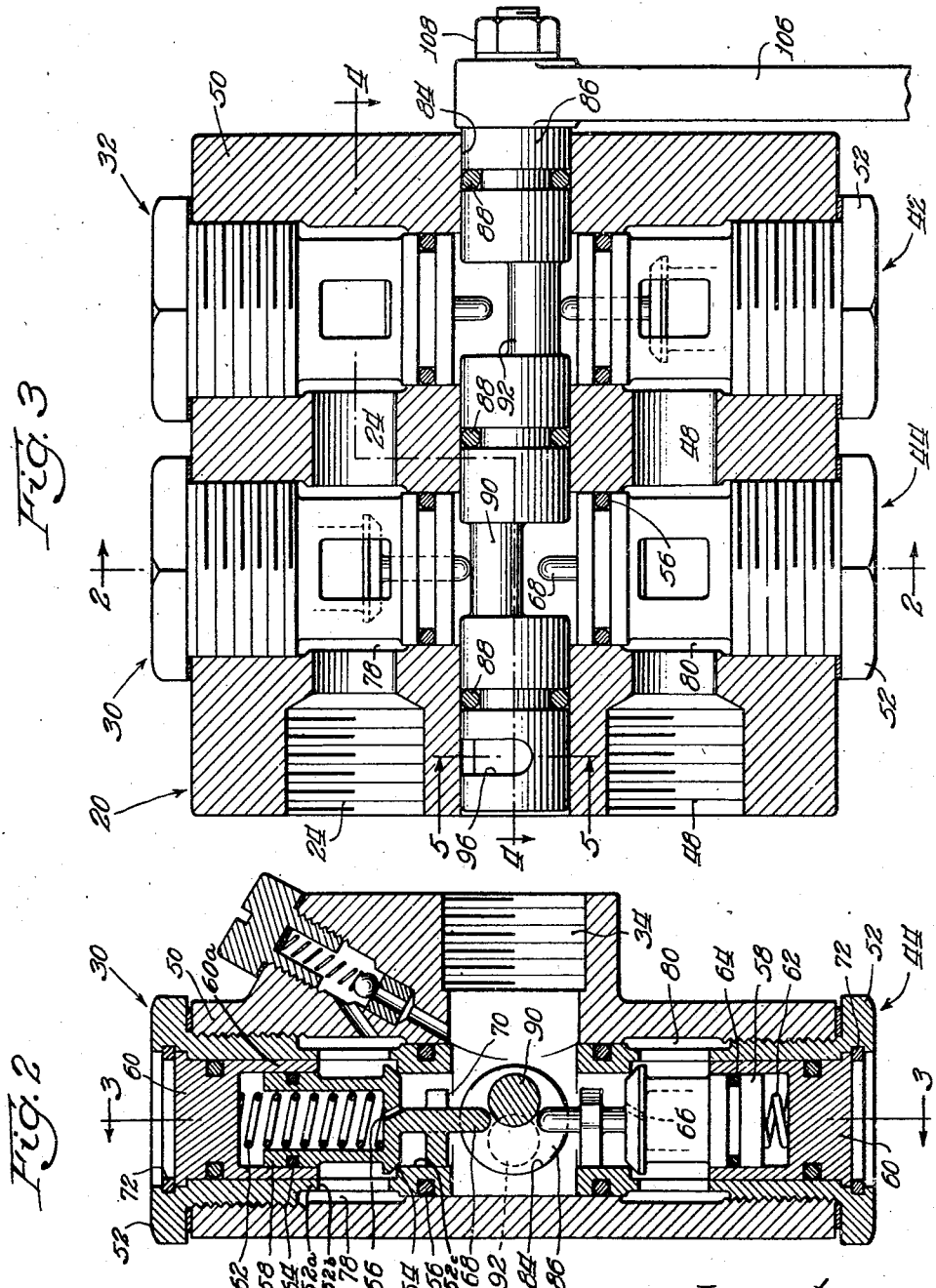

2,423,393

UNITED STATES PATENT OFFICE 2,423,393

BALANCED VALVE ASSEMBLY

John A. Lauck, South Euclid, Ohio, assignor, by mesne assignments, to Borg-Warner Corporation, Chicago, Ill., a corporation of Illinois Application April 30, 1943, Serial No. 485,187

3 Claims. (Cl. 251—132)

This invention relates to the improvement in design and construction of hydraulic selector valves. More particularly, this invention has to do with improvements in the valve means whereby fluid pressure from an accumulator or other source is directed selectively through a plurality of conduits, by means of which a hydraulically operated device is actuated, the selection and actuation of said valves being by use of cam means operated in any convenient manner, such as by hand, linkage, a solenoid, or the like.

In the past, designs and arrangements of devices for accomplishing the above purpose have been very cumbersome and have had a high operating torque. This has been due to the fact that the valve means have not been balanced and have had to open against a head of fluid pressure. Therefore, in the past, the higher the operating pressure, the higher the torque and resistance on the lever operating the cams.

It is an object of the present invention to disclose a means for accomplishing the above-mentioned purpose in which the valves are substantially balanced so that in the cam actuating pressure means, such as a handle or lever for turning the cam shaft, the torque remains substantially constant with variable working pressures, and the torque to be overcome by the operation consists primarily of the valve spring load, which may be very light.

It is a feature of the device that it overcomes the objectionable features of prior devices, such as those above-mentioned.

It is a further object to provide a construction which is relatively simple, is easy to manufacture and assemble, is compact and requires little space, and which is relatively inexpensive.

It is also an object to disclose a valve construction in connection with the above which may be removed and repaired or replaced without disturbing the balance existing in the assembly. In this connection it is an object to provide a device which may be quickly and easily serviced.

Likewise, in connection with the above, it is an object to provide a construction which has a novel and simplified valve arrangement.

These and other objects and features of this invention will become apparent from the following specification when taken together with the accompanying drawings in which:

Fig. 1 is a view showing schematically the preferred arrangement incorporating the invention herein disclosed;

Fig. 2 is a vertical cross-sectional view, taken on the line 2—2 of Fig. 3 looking in the direction of the arrows;

Fig. 3 is a longitudinal sectional view taken on the line 3—3 of Fig. 2 looking in the direction of the arrows;

Fig. 4 is a horizontal cross sectional view, taken on the line 4—4 of Fig. 3 looking in the direction of the arrows; and Fig. 5 is a fragmentary cross-sectional view taken on the line 5—5 of Fig. 3 looking in the direction of the arrows.

Referring more in detail to the construction shown in the various figures, and referring first to the schematic view of Fig. 1, there is disclosed a proposed operating arrangement constituting a preferred embodiment of the invention.

In the schematic arrangement, there is disclosed an assembly shown in its entirety at 20, the details of which will be explained hereafter in connection with the other figures and particularly Fig. 3. This assembly receives fluid from a source such as the supply tank 22, by means of the conduit 24, in which conduit there is located a pump 26 and a pressure accumulator 28. Fluid from the conduit 24 is divided and selectively directed through the selector valves 30 and 32 as the case may be.

From the selector valve 30 fluid enters the two-way conduit 34, which is connected to one or more devices to be operated, such as the fluid motors 36. Preferably, these fluid motors 36 are of the so-called piston type, wherein the piston moves under pressure of the fluid from the accumulator 28. The pistons, here shown as pistons 38, may, in turn, be connected mechanically to anything to be operated by the assembly. The piston rods 40 are provided for such connection.

Synchronized with the selector valve 30 is the return flow valve 42, which latter is adapted to open and close at the same time as the selector valve 30.

Likewise, the selector valve 32 is synchronized with the return flow valve 44, and opens and closes in timed relation to said return flow valve 44. Selector valves 30 and 32, and return flow valves 42 and 44, are sometimes individually or collectively referred to herein as "valves."

The flow of fluid from the conduit 24 may be shifted selectively between the valve 30 and the valve 32, and in the event it is to valve 32, the valve 32 will be open and the fluid will flow into the two-way conduit, herein usually referred to as the reverse conduit 46.

The valves 30, 32, 42 and 44 may all be closed simultaneously, in which arrangement the fluid in the system is locked against movement so that the motors 36 are held stationary.

In the arrangement shown in Fig. 1, with the valves 30 and 42 open, fluid from the conduit 24 passes through the valve 30 into the two-way conduit 34 to the motors, forcing the piston 38 downward (from the position in the illustration shown). In such event the fluid "behind" or "underneath" the piston 38 flows in the direction indicated by the arrows, through the conduit 46, and is discharged through the return flow valve 42 into a discharge conduit 48 leading to supply tank 22.

When it is desired to force the pistons upwardly into the position in which they are now shown in Fig. 1, then the valves 32 and 44 are opened and the valves 30 and 42 closed. In this position the flow of fluid will be from the accumulator through the conduit 24, through the open valve 32, into the reverse conduit 46, and the fluid will force the pistons 38 upwardly. As this occurs, the fluid trapped above the piston will be carried out through the conduit 34, discharged through the valve 44, and into the discharge conduit 48 which leads to the supply tank. It will thus be seen that the device at all times has complete control over the movement of the fluid motors 36, and it can readily be seen that the pressure exerted on valve 42 is balanced against the pressure on valve 30, while the pressure on valve 32 is balanced against the pressure on valve 44, maintaining the valves substantially balanced so far as operating against fluid pressure is concerned. This will be more clearly illustrated hereafter, but inasmuch as the fluid pressure in the system may be rather large, the big advantage of balancing these valves against each other is readily recognizable.

Referring to the other figures, and referring first to Figs. 2 and 3, the valve assembly, shown in its entirety in 20, comprises a housing 50, and it is shown as provided with at least two valves receiving bores extending vertically through the housing. These bores are preferably internally threaded at their ends, as is apparent from Fig. 2, and receive the hollow plugs 52, each of which in turn has a depending skirt portion 52a extending inwardly toward the center of the bore, but stopping short of the center as is clearly apparent from the drawings. At its inner end, each of these plugs 52 terminates in a circumferential ledge portion forming a valve seat 54; a sealing ring is provided between the side wall of the bore and the plug 52, such as the sealing ring 56.

A longitudinally movable spring pressed valve member 58 seats on the valve seat 54 and extends into a hollow cylindrical bore portion formed in a depending skirt portion 60a of a valve insert 60. As clearly seen in Fig. 2 the bored insert 60 is telescopically arranged with respect to the hollow plug 52 and skirt portion 52a. Also the bore of the skirt has the same diameter as valve seat 54 so that the insert skirt 60a and said valve seat have the same cross-sectional area and therefore the valve is balanced against inlet pressure. A coil spring or the like 62 urges said valve member 58 into seated position on the valve seat 54, there being space between the upper portion of the valve member 58 and the insert 60 sufficient for movement of the valve off the seat 54. Preferably the valve is provided with a sealing ring 64, preventing the passage of substantial fluid between the wall of the insert 60 and the wall of the valve member 58. Likewise, a drain 66 is provided through the wall of the valve member 58, preferably at the head, whereby fluid is released from between the inside of the valve member 58 and the insert 60, and will not be entrapped in such a way that the valve member 58 is prevented from moving into an open position. The valve member 58 is provided with an axially extending valve stem 68, for the purpose hereinafter explained, which valve stem 68 preferably passes through a web 70 which assists in retaining the valve properly aligned through its guided relation with cylindrical skirt bore 52c. The insert 60 is preferably held in place by means of a snap ring 72, which engages an annular recess 74 in the end portion of the hollow plug 52 in the well-known manner of snap rings.

It will be observed that by the arrangement above-described, there has been secured a novel and improved arrangement for a valve of this type, and one which is particularly advantageous in a balanced valve assembly. By this arrangement, all of the valves in the system may be properly adjusted in position with the hollow plug 52 tightened to the desired point and held at that point. Should there be a failure of the valve member 58 to function properly for any reason, or should repair be desirable, it is only necessary to remove the snap ring 72 and lift out the insert 60 and the assembly carried therein including the spring 62 and the valve 58. This unit may then be serviced and set back in place without disturbing the adjustment for the valve. The advantages of being able to make a repair of this kind without disturbing the valve settings will be quickly recognized when it is understood that the entire assembly 20 is comprised of valves of this type balanced and adjusted so as to operate in timed and synchronized relation. Further, in the event the valve assembly is broken and a portion must be replaced, it is not necessary to replace the whole.

The depending skirt portion of the hollow plug 52 is provided with an annular circumferential recess 78 and radial parts 52b in communication with conduit 24. This is true in connection with the valves 30 and 32. As to the valves 42 and 44, the construction may be identical, but the channel 80, corresponding to the channel 78 of the valves 30 and 32, opens into the discharge conduit 48. Ports or openings around the walls of the depending skirt portion of the plug 52 have a fluid connection with the channel 78 or 80 as the case may be.

The housing 50 is provided with a transversely extending bore 84, which is located between the two sets of valves, 30 and 32 on one side, and 42 and 44 on the other, in the illustration shown. The cam shaft 86 is rotatably mounted in said bore 84, and preferably is provided with the sealing rings 88 which prevent leakage of fluid from the valve receiving bores above-described. This construction will be clearly understood from examination of Figs. 2, 3, 4 and 5. The cam shaft 86 is preferably provided with a plurality (here shown as two) of diametrically opposite reduced cam portions 90 and 92, which are offset with respect to the axial center line of the cam shaft. These cam portions 90 and 92 engage the valve stems in a manner which is apparent from the drawings, the cam portion 90 engaging the valve stems of the valves 30 and 44, and the cam portion 92 engaging the valve stems 32 and 42. The manner of this engagement will be clear from further description herein.

The cam shaft 86 is preferably retained against axial displacement by means of a set screw 94 (see Fig. 5) which rides in a slot 96. The cam shaft is able to rotate over the circumferential extent of the slot 96, but cannot turn all of the way around because of the engagement of the ends of the slot with the set screw 94. Neither can the cam shaft be moved any substantial distance axially thereof. The retainer member 98 here indicated as in the form of a set screw with a spring pressed ball (see Fig. 4) is carried by the housing 50, and engages, selectively, depressions 100, 102 and 104 to retain the cam shaft 86 in the position to which it has been rotated. The operation of these will also be clear from description further herein.

The cam shaft 86 may be manipulated by any convenient means, such as by a handle or lever 106 which is preferably keyed or otherwise attached to the cam shaft, and held in place by means of the nut 108 in the usual manner.

The operation of the device will be most clearly illustrated by referring to Figs. 1, 2, 3 and 5. When the handle 106 is in the position indicated in Fig. 3, the cam surface 90 engages the stem of the valve 30, lifting the valve off of the seat and allowing fluid from the conduit 24 to flow through the valve. This fluid will be carried by the conduit 34 to the fluid motors 36 and 36. At the same time, the cam surface 90 moves away from the valve stem of the return flow valve 44, and that valve is closed. Likewise, at the same time, the oppositely disposed cam surface 92 engages the stem of the return flow valve 42 and opens that valve, while moving away from the stem of the valve 32 which closes. When the valve 42 opens, fluid from the reverse conduit 46 flows therethrough into the discharge conduit 48, the arrangement being that disclosed in Fig. 3. In this position, the ball of retainer 98, will engage the cam shaft as indicated in Fig. 5. The spring pressed ball of the retaining member 98 thus engages the depression 100.

When the cam shaft is rotated by means of the lever 106 to the position where the spring pressed ball of member 98 engages in depression 102, the cam surfaces 90 and 92 are out of engagement with the valve stems of the various valves, or at least are in neutral position whereby these valves are all closed. In this position the system is static, and there is no movement of fluid or of the pistons 38 of motors 36.

Further movement of the lever or handle 106 rotating cam shaft 86 to a position where the ball of the member 98 engages the depression 104, causes the cam surface 90 to engage the stem of the valve 44 and the cam surface 92 to engage the stem of the valve 32, thus opening these valves. At the same time the stems of the valves 30 and 42 will be disengaged and these valves will close. In this position the arrangement is the reverse of that shown in Fig. 3, and the fluid from the conduit 24 is carried into the reverse conduit 46 and moves the pistons 38 of the fluid motor 36 into a position substantially that shown in Fig. 1. At the same time, fluid from the conduit 34 will be returned through the valve 44 into the discharge conduit 48, where it is returned to the supply tank for further use.

It is understood that the whole system is usually full of fluid in the normal operation, but that the variable pressure is the determining factor in the movement of the fluid motors. The reverse pressure from the conduits on the way to the supply tank will substantially balance the valves opening against the pressure from the accumulator, so that the handle 106 merely has to overcome the spring pressure of the spring 62 and the spring pressure of the retainer member 98.

It is thus seen that an improved balanced valve assembly is provided.

While I have disclosed my invention in connection with certain specific embodiments thereof, it is to be understood that these are by way of example rather than limitation, and it is intended that the invention be defined by the appended claims which should be given a scope as broad as consistent with the prior art.

I claim:

1. A valve comprising in combination a hollow plug with a depending skirt portion and provided with port means in said skirt portion and a radially inwardly extending ledge portion comprising a valve seat adjacent the end of said skirt, said skirt likewise having a valve guiding portion extending radially inwardly and bored to guidably receive the stem of a valve therein, an insert likewise having a skirt portion, said insert being seated in said hollow plug and removably retained therein by a snap ring, a valve element movably mounted in the skirt of said insert, said valve element seating on said valve seat whereby the end of said plug is closed, said valve element having a depending stem portion extending through said guiding portion, spring means urging said valve element in seating direction, the arrangement being such that said valve element is normally seated, but may be unseated by pressure exerted on the end of said valve stem whereby passage means is opened from said port means in the skirt of the plug and through said valve between said valve element and said valve seat.

2. A valve assembly comprising in combination a housing having a bore opening through the exterior thereof, a hollow plug removably received in the outer open end of said bore, said plug provided with a depending skirt portion having port means therein, a valve seat in the inner portion of said skirt portion, an insert having a skirt portion, said insert being telescopically seated in said hollow plug, means removably retaining said insert in said hollow plug to close the outer end thereof, a valve element seated on said valve seat and adapted to be raised therefrom for the passage of fluid between said valve element and said valve seat, said valve element being guided within said insert skirt and held in said hollow plug by said insert and said valve seat, and means comprising a valve stem adapted to unseat said valve by pressure exerted on the end of said valve stem, whereby fluid is allowed to flow past said valve element into communication with said port means.

3. A valve assembly comprising a housing having a bore opening through the exterior thereof; a hollow plug removably received in the outer open end of said bore, said plug having a depending skirt with port means therein; an internal valve seat at the inner portion of said skirt; an insert telescoped within said plug, said insert being closed at its outer terminal and bored inwardly from its inner end to define a skirt extending in the same direction as said plug skirt; means removably retaining said insert in said plug to close the outer terminal thereof; a valve element seated on said valve seat and adapted to be raised therefrom for the transfer of fluid past said valve seat; a hollow sleeve extending from said valve element into said insert skirt to be guided therein; seal means between said valve sleeve and said plug skirt; and spring means acting on said valve element to urge it in the direction of said valve seat, said spring means being encompassed by said valve sleeve and said insert skirt and bearing at its outer end on the outer terminal of said insert.

JOHN A. LAUCK.

REFERENCES CITED

The following references are of record in the file of this patent:

UNITED STATES PATENTS

| Number | Name | Date |
|---|---|---|
| 2,138,125 | Schultz | Nov. 29, 1938 |
| 2,009,845 | Farmer | July 30, 1935 |
| 2,202,960 | Parker | June 4, 1940 |
| 2,286,282 | Joesting | June 16, 1942 |
| 2,299,719 | Frimel | Oct. 20, 1942 |
| 2,282,490 | Martin | May 12, 1942 |
| 2,241,077 | Thoma | May 6, 1941 |
| 864,262 | Robertshaw | Aug. 27, 1907 |
| 2,272,243 | Jacobsson | Feb. 10, 1942 |
| 1,105,947 | Woods | Aug. 4, 1914 |